United States Patent
Kong

(10) Patent No.: US 10,042,056 B2
(45) Date of Patent: Aug. 7, 2018

(54) SIGNAL PROCESSING METHOD FOR ULTRA-FAST ACQUISITION AND TRACKING OF SEVERELY ATTENUATED SPREAD SPECTRUM SIGNALS WITH DOPPLER FREQUENCY AND APPARATUS THEREOF

(71) Applicant: Korea Advanced Institute of Science and Technology, Daejeon (KR)

(72) Inventor: Seung-Hyun Kong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 266 days.

(21) Appl. No.: 14/599,257

(22) Filed: Jan. 16, 2015

(65) Prior Publication Data
US 2015/0204981 A1    Jul. 23, 2015

(30) Foreign Application Priority Data
Jan. 20, 2014 (KR) .................. 10-2014-0006807

(51) Int. Cl.
*G01S 19/29* (2010.01)
*H04B 1/7077* (2011.01)
(Continued)

(52) U.S. Cl.
CPC .............. *G01S 19/29* (2013.01); *G01S 19/24* (2013.01); *H04B 1/7077* (2013.01); *G01S 19/30* (2013.01)

(58) Field of Classification Search
CPC ...... G01S 19/24; G01S 19/243; G01S 19/246; G01S 19/29; G01S 19/30; G01S 19/35; G01S 19/36; H04B 1/7073; H04B 1/7075; H04B 1/70751; H04B 1/70752; H04B 1/70753; H04B 1/70754; H04B 1/7077; H04B 1/7087
See application file for complete search history.

(56) References Cited

U.S. PATENT DOCUMENTS 5,036,329 A * 7/1991 Ando .................. G01S 19/29
342/357.68
5,059,969 A * 10/1991 Sakaguchi ............ G01S 19/29
342/352
(Continued)

*Primary Examiner* — Gregory C Issing
*Assistant Examiner* — Daniel P Malley, Sr.
(74) *Attorney, Agent, or Firm* — Paratus Law Group, PLLC

(57) ABSTRACT

A signal processing method for ultra-fast acquisition and tracking of severely attenuated spread spectrum signals with Doppler frequency and apparatus thereof are disclosed herein. The signal processing method may include a step of searching for at least one receiving signal from Global Navigation Satellite System (GNSS) positioning signals or Spread Spectrum signals in a signal processing device, wherein the step of searching for at least one received signal includes a sparse Doppler frequency search (SDFS) step performing signal search for respective sparse Doppler frequencies being spaced apart from one another by a first interval, and a synthesized Doppler frequency testing (SDFT) step performing signal search for respective synthesized Doppler frequencies being spaced apart from one another by a second interval between the sparse Doppler frequencies, the second interval being shorter than the first interval.

6 Claims, 5 Drawing Sheets

(51) Int. Cl.
*G01S 19/24* (2010.01)
*G01S 19/30* (2010.01)

(56) References Cited

U.S. PATENT DOCUMENTS

| | | | | |
|---|---|---|---|---|
| 5,177,490 | A * | 1/1993 | Ando | G01S 19/29 |
| | | | | 342/357.68 |
| 5,347,284 | A * | 9/1994 | Volpi | G01S 19/21 |
| | | | | 342/356 |
| 5,535,237 | A * | 7/1996 | LaPadula, III | G01S 19/21 |
| | | | | 342/352 |
| 6,366,599 | B1 * | 4/2002 | Carlson | G01S 19/30 |
| | | | | 375/130 |
| 6,407,699 | B1 * | 6/2002 | Yang | G01S 19/21 |
| | | | | 342/357.59 |
| 2001/0033606 | A1 * | 10/2001 | Akopian | G01S 19/29 |
| | | | | 375/149 |
| 2006/0071851 | A1 * | 4/2006 | Graas | G01S 19/29 |
| | | | | 342/357.395 |
| 2010/0079339 | A1 * | 4/2010 | Yoon | G01S 19/24 |
| | | | | 342/357.68 |
| 2012/0293366 | A1 * | 11/2012 | Liu | G01S 19/24 |
| | | | | 342/357.26 |

* cited by examiner

US 10,042,056 B2

SIGNAL PROCESSING METHOD FOR ULTRA-FAST ACQUISITION AND TRACKING OF SEVERELY ATTENUATED SPREAD SPECTRUM SIGNALS WITH DOPPLER FREQUENCY AND APPARATUS THEREOF

CROSS-REFERENCE TO RELATED APPLICATION

This application claims priority to and the benefit under 35 U.S.C. § 119(a) of Korean Patent Application No. 10-2014-0006807, filed on Jan. 20, 2014, in the Korean Intellectual Property Office, the entire disclosure of which is incorporated herein by reference for all purposes.

BACKGROUND

Field

The following description relates to a technology for performing high-speed (or fast) signal search for respective signals of a Spread Spectrum and a Global Navigation Satellite System (GNSS), such as a Global Positioning System (GPS).

Discussion of Related Art

The GNSS collectively refers to a position measurement satellite system, such as a GPS, and the GNSS is used for measuring a Time of Arrival (TOA) of a radio wave (or frequency wave) being transmitted from a satellite antenna and received by a GPS receiver and, at the same, for calculating a relative position of a receiver by locating the position of a satellite corresponding to the point when the radio wave, which is received by the receiver, is transmitted from the satellite from the received signal. A signal being transmitted to the ground from all GNSS satellites corresponds to a Direct Sequence Spread Spectrum signal, which is used in a general wireless communication system. When driving (or starting) the receiver equipped in all types of communication and satellite navigation systems, one of the tasks that should be performed firsthand is to search for a signal and to acquire a code phase (i.e., accurate time) of a signal that is currently being received and an accurate frequency and required information (satellite position and error) of the signal that is being received.

When performing initial position acquisition of the GPS receiver, and when the GPS receiver has been in a power off state for a long period of time and then shifted back to a power on state in order to perform initial position measurement, this case is referred to as a Cold Start. And, in this case, the time that is consumed for performing a process of searching for a signal and acquiring the signal (a process of gaining an accurate code phase and frequency information and establishing synchronization with the received signal) is referred to as a Time To First Fix (TTFF). The cold start of a GPS receiver for searching for a Coarse Acquisition (C/A) signal that is being returned to an L1 frequency (1.575 GHz) of the GPS is realized in accordance with a plurality of process steps. And, most particularly, a step of searching for a code phase (corresponding to a time delay of a signal) hypothesis range and a Doppler frequency (occurring due to a relative speed between the satellite and the receiver) hypothesis range of a satellite signal requires a highest hardware complexity level. More specifically, since the GPS L1 frequency C/A code is configured of 1,023 code chips, the code phase hypothesis that should be searched (verified) corresponds to a total of 2,046 code phases in 0.5 chip units. Additionally, since the GPS satellite revolves around the Earth at a speed of approximately 3 Km/sec at an altitude of approximately 22,000 km, when observed from a ground receiver (or terrestrial receiver), the Doppler frequency of the GPS satellite signal may be generated within a range starting from −5 KHz to +5 KHz. Therefore, in case a (minimum) frequency search unit Δf corresponds to 500 Hz, a total of 21 Doppler frequency hypotheses should be verified at an interval of 500 Hz starting from −5 KHz to +5 KHz. Therefore, when considering all number of cases, the total number of search hypotheses is equal to 42,000. The GPS receiver is required to search for a C/A signal and to acquire a code phase and a Doppler frequency for the following reason. By establishing accurate synchronization with a GPS satellite signal that is being received at a current moment, the corresponding GPS satellite signal may be continuously tracked without being lost and an accurate signal wave time (i.e., distance) measurement value may be acquired, while, at the same time, satellite navigation information that is carried by (or included in) the GPS signal can be extracted.

The GPS receiver uses a correlator having a longer correlation length in order to detect an attenuated signal (or weak signal). In this case the Doppler frequency hypothesis should be searched in smaller units.

For example, in case the signal correlation length is equal to T=1 msec, the search for a Doppler frequency should be performed by searching for a minimum of 21 hypotheses in units of Δf<=1/(2T)=500 Hz, whereas, in case the signal correlation length is equal to T=100 msec, a minimum of 2,001 Doppler frequency hypotheses should be searched by using Δf=1/(2T)<=5 Hz. If a significantly long correlation length of T=1 sec is used, since the search process is performed in smaller units of Δf (=0.5 Hz) starting from −5 KHz to +5 KHz, a minimum total of 20,001 Doppler frequency hypotheses should be verified. At this point, the total number of hypotheses is equal to 20,001×2,046≈×$10^7$. Therefore, when considering the correlation length of T=1 sec, a receiver using only one correlator is required to perform signal search for a maximum time period of 4×$10^7$ seconds.

In order to perform Phase Coherent Correlation and Integration during a time period of T seconds for the search of one Doppler frequency and code phase, a process of gaining r[n]×$r_1$[n] by performing correlation (i.e., multiplication) between received signal samples (r[n] for n=0, 1, 2, . . . , $f_s$T−1, wherein fs corresponds to a sampling frequency), which are received during a time period of T seconds, and receiver replica signal $r_1$(t) samples ($r_1$[n] for n=0, 1, 2, . . . , $f_s$T−1) having the same Doppler frequency and code phase, and comparing an integration result value Z(=|$\Sigma_{n=0}^{f_sT-1}$r[n]$r_1$[n]|$^2$) corresponding to an integration of the correlation (multiplication) results between the samples with a direction threshold value (γ). At this point, if the Doppler frequency or code phase of $r_1$(t) is not the same as that of the signal being received, the value of Z has a value equal to or smaller than the threshold value. Therefore, the receiver searches for a signal by performing the correlation and integration process with respect to the combination of all Doppler frequencies and all code phases.

As described above, generally, as the value of T increases, and as the sampling frequency ($f_s$) respective to the signal being received becomes greater, the integrated number of samples (=fsT) is increased, and the computational load required for the hypothesis search is also increased. Therefore, as the value of T increases, since the number of hypotheses that are required to be verified (or tested) increases, and since the computational load also increases at the same time, computational resources that are consumed in order to detect an attenuated signal increases at an exponential rate. As described above, despite the complexity in the process of performing signal search by verifying numerous hypotheses and acquiring the detected signal, in order to quickly locate the position of the receiver, since the verification and acquisition process should be performed at the same time as the receiver is turned on, a significant amount of hardware resource is instantly concentrated in performing the signal acquisition process, and, after completing the signal acquisition process, the hardware resource is no longer used. Accordingly, this process is very inefficient.

Diverse technologies have been researched and developed in order to accelerate the performance of such signal detection, and, among such technologies, one of the simplest technologies corresponds to a method of using multiple parallel correlators. For example, each of 42,000 parallel correlators simultaneously verifies the hypotheses of the code phase and Doppler frequency combination within a time period of 1 msec, signal acquisition may be quickly completed. However, since a considerably large number of correlators is used for only one time, in the aspect of using hardware resources, this method is highly inefficient. Another method corresponds to a method of performing a very fast correlation by multiplying the received signal by a code signal (PRN code signal), which is generated from the inside of the receiver, in a frequency domain by using Fast Fourier Transform (FFT) (FFT-based technology). And, in order to do so, the received signal r(t) and the signal generated from the inside of the receiver $r_1(t)$ should be processed with Fourier Transform in all frequency domains, and, after performing multiplication in the frequency domain, the multiplication result is required to be processed with Inverse Fourier Transform back to the time domain. Therefore, the correlator is not required in this process, yet the computational load becomes extremely high. The above-described FFT-based signal search technology having the high computational load may be realized by using a DSP chip, which is equipped with high speed. And, since the DSP chip may be used for purposes other than the signal search, the hardware inefficiency may be enhanced. However, due to the usage of the DSP chip, the fabrication cost may become another problem.

In the above-described FFT-type signal search technologies, the conventional technology that can reduce the computational load includes an averaging correlator (AC) technology and a shifting replica (SR) technology. In the AC technology, in a case when two or more sampling frequencies are given per chip (i.e., $fs=q_cRsRc$, $q_cRs>=2$, wherein Rc is a chip rate, fs is a sampling rate, qc is the number of compressed samples per chip and Rs is a sample compression rate), an average of $q_cRs$ number of consecutive samples is calculated, so as to generate a received signal, which is indicated for each chip, and a signal sample is generated for each chip within the receiver, thereby carrying out the correlation. The AC technology is advantageous in that correlation may be performed by using a number of signal samples that is reduced to $q_cRs$ time the number of signal sampled used in the conventional method. However, since a highest correlation result is obtained when consecutive samples having the average value belong to the same chip, a sample starting point having the highest integration result is located by performing $q_cRs$ number of correlation/integration sessions based upon $q_cRs$ number of different sample starting points. Accordingly, the AC technology performs a process step of generating an average signal having a total of $q_cRs$ different sample offsets and finding a maximum value from $q_cRs$ number of correlation results. Generally, when FFT-based correlation is performed from N number of complex signal samples, since N $\log_2$N number of multiplications are required for the N number of sample multiplications and IFFT, a total of $N(\log_2 N+1)$ number of complex multiplications are required to be performed. Therefore, when $fs=q_cRsRc$, since $N=q_cRsRcT$, in case of the conventional technology, $q_cRsRcT(\log_2 q_cRsRcT+1)$ number of complex multiplications are required to be performed. However, in case of the AC technology, $q_cRs$ ($RcT\log_2 RcT+RcT$) number of complex multiplications are performed and used.

Another technology corresponds to the SR technology, wherein $T=R_TT_1$ (herein, $T_1=1$ ms), and wherein a received signal is sampled by using a frequency of $fs(=q_cRsRc)$, so as to create a two-dimensional (2D) matrix U having a size of $[q_cRsRcT_1 \times R_T]$, so that the computational load can be reduced by using a 2D FFT respective to U. When using the SR technology, $2q_cRsRcT_1R_T[\log_2(2q_cRsRcT_1)+\log_2(R_T)+1]$ number of complex multiplications are performed and used with respect to the received signal, and since $42q_cRsRcT_1R_T[\log_2(2q_cRsRcT_1)+1]$ number of multiplications are performed and used in the frequency domain, the computational load may be reduced to 10 to 100 times that of the AC technology.

However, in the conventional technologies, such as the AC technology and the SR technology, Phase Coherent Correlation and Integration cannot be performed during a time period (T>>Tb) that is longer than the time length (Tb) of data carried by the signal. More specifically, during an initialization process of the receiver, wherein the received data value (+1 or −1) is unknown, when the Phase Coherent Correlation result is being integrated, since the phase of the correlation result may be changed by 180 degrees)(180° due to a change in the data value, the size of the integrated result may be reduced instead of being increased, and this may eventually lead to a failure in the signal detection. Therefore, in the conventional technology, a Non-coherent integration procedure is performed, wherein the phase coherent correlation length is limited to Tco(=5 ms or 10 ms), which is shorter than Tb, and wherein, after acquiring an absolute value of the phase coherent correlation and integration result during the time period of Tco seconds, the acquired absolute value is added to an absolute value of the phase coherent correlation and integration result acquired during the next Tco seconds, and wherein this process is repeatedly performed. This Non-coherent integration procedure is repeated for Nnc number of times, and, in case of a severely attenuated signal, since the amount of energy of the signals being accumulated by using the phase coherent method is small, and since the Signal-to-Noise Ratio (SNR) is reduced during the process of acquiring the absolute values, the Nnc is generally set up to have a high value (i.e., TcoNnc>>T), so that the SNR of the final non-coherent integration result can have a sufficiently high value. As a result, in the above-described non-coherent technology, since TcoNnc>>T, a larger amount of time is consumed in order to test one search hypothesis.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a signal processing method including a step of searching for at least one receiving signal from Global Navigation Satellite System (GNSS) positioning signals or Spread Spectrum signals in a signal processing device, wherein the step of searching for at least one received signal includes a sparse Doppler frequency search (SDFS) step performing signal search for respective sparse Doppler frequencies being spaced apart from one another by a first interval, and a synthesized Doppler frequency testing (SDFT) step performing signal search for respective synthesized Doppler frequencies being spaced apart from one another by a second interval between the sparse Doppler frequencies, the second interval being shorter than the first interval.

The signal processing method may search for all Doppler frequencies respective to the received signal by using a method of searching for all sparse Doppler frequencies firsthand through the SDFS step and storing search results acquired from all of the sparse Doppler frequencies in a temporary memory, and searching for synthesized Doppler frequencies located between the sparse Doppler frequencies by using search results stored in the temporary memory through the SDFT step.

The signal processing method may search for all Doppler frequencies respective to the received signal by using a method of searching for two sparse Doppler frequencies firsthand through the SDFS step and searching for a synthesized Doppler frequency located between the two sparse Doppler frequencies, and, when a signal is not detected, searching for a new sparse Doppler frequency once again through the SDFS step and searching for a synthesized Doppler frequency located between any one of the existing two sparse Doppler frequencies and the new sparse Doppler frequency.

The SDFS step include searching a part region of a total hypotheses region at regular interval or irregular interval in a total search range of Doppler frequency for searching Doppler frequency.

The SDFT step may include selecting a signal matrix corresponding to two neighboring sparse Doppler frequencies from multiple signal matrices acquired for the sparse Doppler frequencies, when signal search is failed in the SDFS step, creating a summed signal matrix by performing element-by-element summing of the two selected signal matrices, compensating amplification distortion occurring during the summing process by multiplying each row of the summed signal matrix by a specific real number, and acquiring a search result respective to a synthesized Doppler frequency corresponding to an intermediate Doppler frequency between the two sparse Doppler frequencies by summing each column of the summed signal matrix having its amplification distortion compensated and deciding a final signal respective to a current synthesized Doppler frequency, when the search result is greater than or equal to a threshold value.

In another general aspect, there is provided a signal processing device including a signal search unit configured to search for at least one receiving signal from Global Navigation Satellite System (GNSS) positioning signals or Spread Spectrum signals, and wherein the signal search unit includes a Doppler frequency searcher configured to perform signal search for respective sparse Doppler frequencies being spaced apart from one another by a first interval, and a Doppler frequency tester configured to perform signal search for respective synthesized Doppler frequencies being spaced apart from one another by a second interval between the sparse Doppler frequencies, the second interval being shorter than the first interval, by using a result of the Doppler frequency searcher.

Other features and aspects will be apparent from the following detailed description, the drawings, and the claims.

Figure 1:
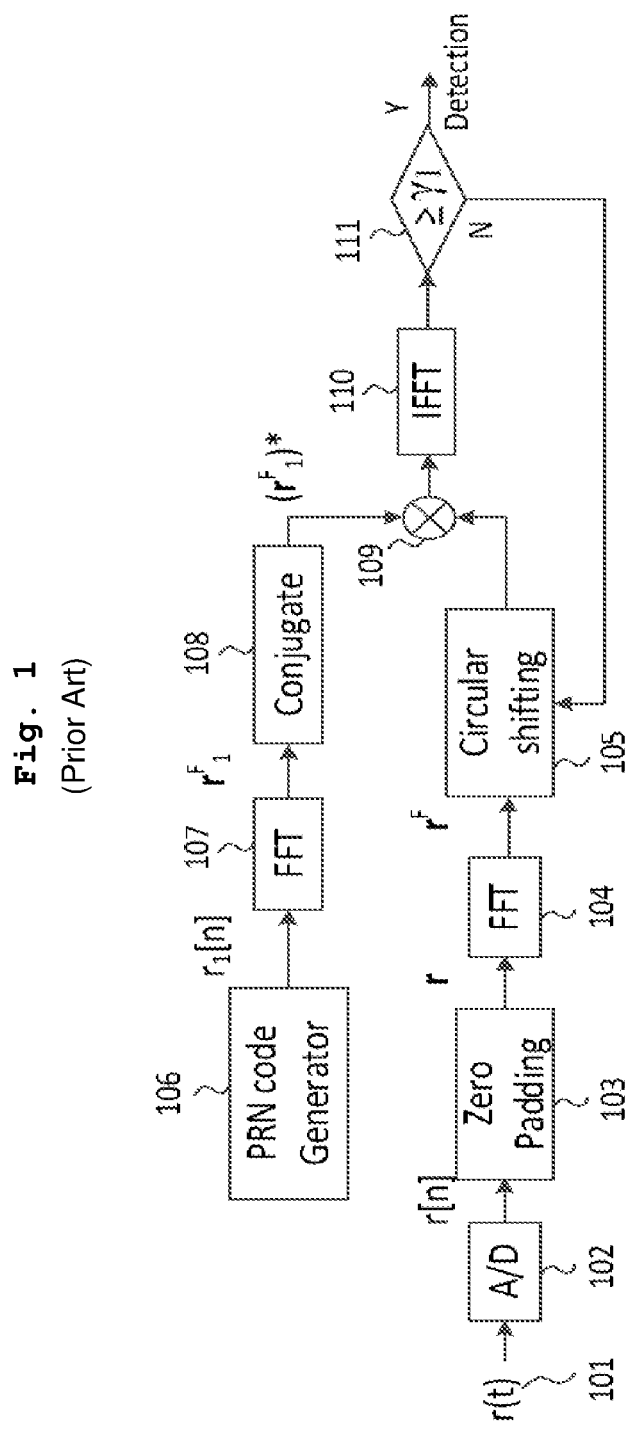
FIG. 1 is a block diagram illustrating an example of a process flow of a signal processing function of a general conventional FFT-based signal searcher.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A receiver performs Phase Coherent Correlation and Integration for a long period of time in order to search for severely attenuated spread spectrum signals of a Global Navigation Satellite System (GNSS), such as a Global Positioning System (GPS).

The following description related to a signal processing method that can outstandingly reduce signal search time and computational load, which enables ultra-fast Doppler frequency search based on a Synthesized Doppler Frequency Testing (SDFT) technology without having to actually perform correlation and integration.

The GNSS inclusively refers to all types of satellite navigation systems including the GPS of the United States of America (i.e., Glonass of Russia, Galileo of the European Community, Beidou of China, QZSS of Japan, and so on).

Hereinafter, the GPS will be given as a typical example of the GNSS, since all types of the GNSS basically use spread spectrum signals. And, therefore, unless specifically differentiated, all GNSS receivers will be understood as having the same meaning. Furthermore, since the same function is performed by a received of a mobile communication system using spread spectrum signals, the scope of the signal processing method may be applied to diverse types of mobile communication systems, satellite communication systems, and navigation systems, such as GPS (GNSS).

FIG. 1 is a block diagram illustrating an example of a process flow of a signal processing function of a general conventional FFT-based signal searcher.

Referring to FIG. 1, which shows a process flow of a signal processing function of a conventional GNSS receiver, a radio frequency (RF) signal (high frequency signal) of the GNSS, which is received through a reception antenna is primarily processed with frequency down conversion, so as to be down-converted to an intermediate frequency (IF) band having an intermediate frequency $f_I$(1.023 MHz≤$f_I$<100 MHz), thereby being shown as r(t) 101.

The down-converted received signal r(t) passes through an analog-to-digital converter (ADC) 102, and, then, fs number of signal samples r[n] are gained per second by a sampling frequency fs (generally being 2 times greater than or equal to the chip rate Rc, i.e., fs≥2Rc) (i.e., sampling is performed to t=n/fs). And, a signal vector Vr={r[n]|n=0, 1, 2, . . . , fsT−1} having collected the r[n] during T=$T_1$=1 ms, which corresponds to one cycle period of a spread code, are converted to new a signal vector r={Vr, {0, 0, . . . , 0}} having $Q_1$ number of elements (wherein $Q_1$ corresponds to an integer power of 2) by adding an adequate number of zeros (0's) for the FFT conversion, and, then, the converted signal vector is inputted to an FFT block 104.

The FFT block 104 outputs a frequency domain signal vector $r^F$ having the size of $Q_1$ (herein, $r^F$ corresponds to a $Q_1$-point FFT{r} output). If $Q_1$≥2fs$T_1$, the number of signal samples corresponds to approximately 2 ms. Therefore, each time all elements of the frequency domain signal vector $r^F$ collectively perform a circular shift (i.e., new position of element=(previous position of the corresponding element+1) modulo $Q_1$) to one point, depending upon the movement direction, $r^F$ becomes a signal vector that is identical to the frequency domain signal vector, which is gained when an intermediate frequency (or center frequency) $f_I$ is greater than or smaller than 500 Hz. (For example, the result of performing circular shift by one point on each element of vector V=[1, 2, 3, 4, 5] corresponds to V'=[5, 1, 2, 3, 4].) Therefore, in block 105, when the elements of $r^F$ perform cyclic shift by K points, the result may be expressed as $r^F$⊙δ[k−K] (herein, k=0, 1, 2, . . . , $Q_1$−1, and δ[k−K] indicates a Kronecker delta function, which is equal to 1 only when k=K, and which is equal to 0 in the other cases, and ⊙ represents a circular convolution).

In block 106, a Pseudo-Random Noise (PRN) code signal of a satellite signal that is to be searched is generated as a Square wave continuous signal having a chip rate of Rc=1.023 MHz. And, then, the generated signal is sampled to a sampling frequency of fs, so that the signal can have a sample rate of r[n]. Thus, $Q_1$ number of signal samples $r_1$[n] (n=0, 1, . . . , $Q_1$−1) are finally generated and then inputted to FFT block 107.

The output $r_1^F$ of the FFT block 107 acquires a conjugate in block 108 and is, then, multiplied by the output of block 105 in block 109 (i.e., $(r_1^F)^*.*(r^F⊙)δ[k-K]$ is performed, and, herein, .* indicates an element-by-element multiplication), and the $Q_1$ number of multiplication results, which are generated as the results of block 109, are processed with $Q_1$-point IFFT. And, among the $Q_1$ number of IFFT outputs, only the first fs$T_1$ number of outputs are acquired, thereby gaining an Auto-correlation function output (ACF output) matrix R[n,F] in the time domain, i.e., an auto-correlation result of all code phases (n=0, 1, . . . , fs$T_1$−1) respective to the Doppler frequency index F.

Accordingly, n indicates a sample index within a time axis (i.e., an index respective to all code phases in a time unit of Ts=1/fs), and, as a Doppler frequency index, in case of the conventional receiver shown in FIG. 1, F represents an index respective to Doppler frequencies being search in Δf=1/(2T) Hz units. In case Δf=500 Hz, the indexes respective to the total of 21 Doppler frequencies starting from −5 kHz to +5 kHz are indicated in an increasing order starting from a lowest frequency (−5 kHz→F=0) to a highest frequency (+5 kHz→F=21). When a value for performing the circular shift in block 105 is given as K, F=0 corresponds to K=−10, and F=21 corresponds to K=10. A discriminator (block 111) finds n having the largest value among the output R[n,F] (n=0, 1, . . . , fs$T_1$−1) (i.e., n̂=arg$_n$ max R [n,F]), and, then, the discriminator 111 compares the R[n̂, F] with the threshold value ($γ_1$) and declares Signal Detection when R[n̂, F]≥$γ_1$. Generally, when signal detection is declared, the receiver performs a repeated verification (or testing) process in order to verify whether or not the searched information is correct, by repeating a signal correlation process with respect to the searched Doppler frequency (F) and the code phase (n̂) of the signal 10 to 20 times. If the Signal Detection is not declared, each of K and F are incremented by one (1).

Thereafter, an element-by-element multiplication $((r_1^F)^*.*(r^F⊙)δ[k-K])$ is executed between the new outputs $r^F⊙δ[k-K]$ of block 105 by using the existing output $(r_1^F)^*$ and the K value, which is incremented by one (1). And, then, the results of the new element-by-element multiplication are processed with IFFT, so as to gain new outputs of block 110. Subsequently, the determination process passing through block 111 is repeated. The new search and determination processes, which are performed from block 105 to block 111, are repeated until the Signal Detection is declared.

Figure 2:
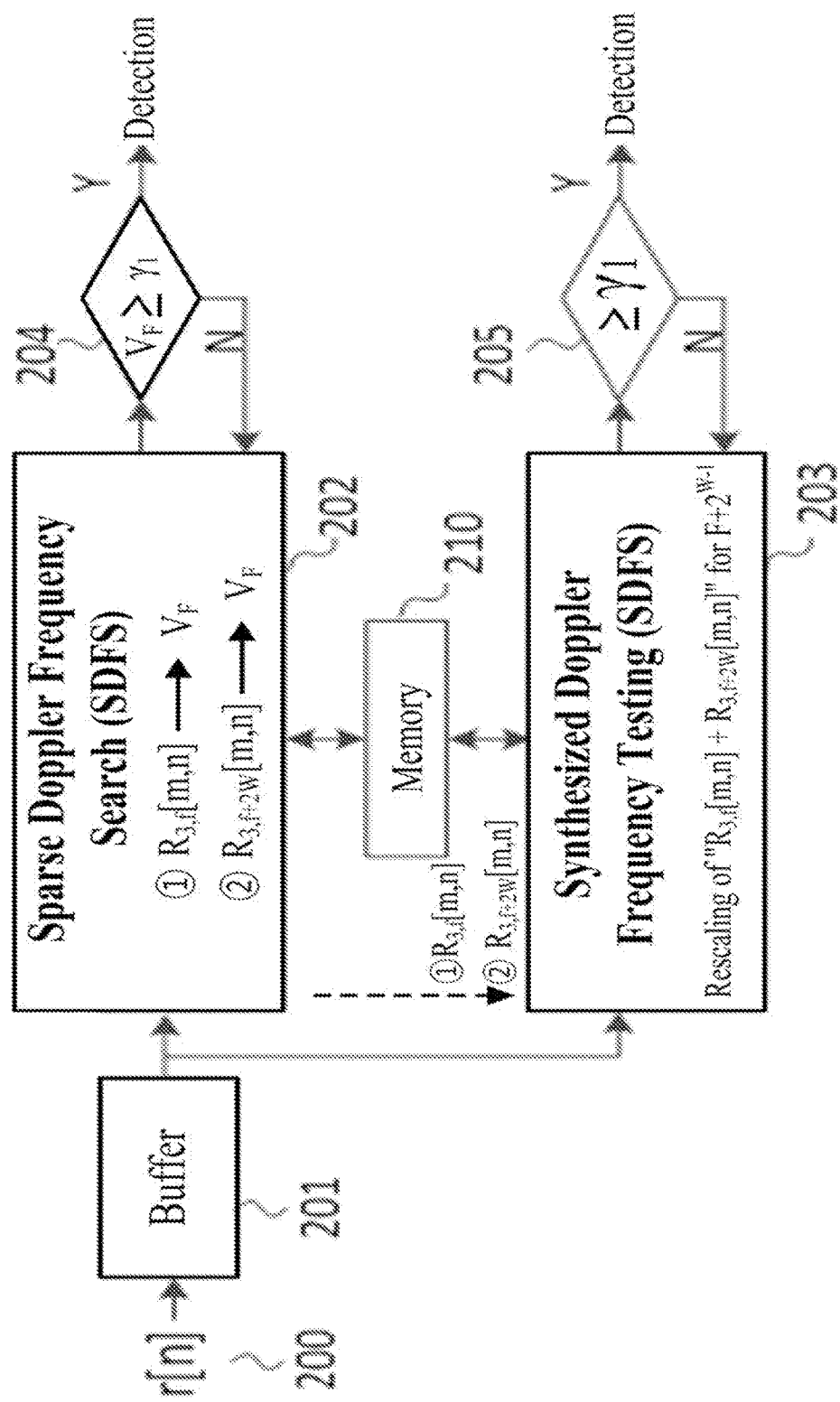
FIG. 2 is a block diagram illustrating an example of a general structure of a signal searcher of a GNSS receiver based upon SDFS and SDFT technologies.

FIG. 2 is a block diagram illustrating an example of a general structure of a signal searcher of a GNSS receiver based upon SDFS and SDFT technologies. FIG. 2 illustrates a structural view of a signal processing procedure of a receiver performing a quick GNSS signal detection process by using an SDFS technology (block 202) and an SDFT technology (block 203).

First of all, as described above in FIG. 1, a signal r[n] 200, which is acquired during a time period of T seconds by sampling a signal r(t) that is frequency down-converted to the intermediate frequency ($f_I$) by using a sampling frequency fs is inputted to a temporary memory (or Buffer) 201. Signal samples having the length of T seconds, which are inputted to the temporary memory 201, are primarily inputted to a Doppler frequency searcher (hereinafter referred to as 'SDFS') 202.

The SDFS 202 carries out a function of performing signal search for each sparse Doppler frequency hypothesis (respective to all code phases) having an interval of Δf (i.e., 500 Hz). As an example of performing signal search, the SDFS 202 performs an FFT-based signal search, which is similar to the method shown in FIG. 1 (a detailed description of the same will be given later on with reference to FIG. 3). The search results $R_{3,F}[m,n]$, which are searched by the SDFS 202 for each sparse Doppler frequency hypothesis, are summed along the column direction, so as to create a final search result vector ($V_F$) respective to the frequency index F (herein, m indicates a data set having an $m^{th}$ $T_1$-length among a total of $T/T_1$ data sets, n represents a code phase index having a value of $[0 \sim fsT_1-1]$ and is indicated as $F=2f_mf_c$, $f_c$ corresponds to a Doppler frequency index of a sparse Doppler frequency and is indicated as $f_c=0, 1, \ldots, 5M_f$ (wherein generally $M_f=4$), $2f_m$ indicates an index interval between the sparse Doppler frequencies, wherein, when the index of the lowest sparse Doppler frequency corresponds to F=0, the index of the second lowest sparse Doppler frequency corresponds to $F=2f_m$, and a lower level character 3 indicates three dimensions of F, m, and n).

Thereafter, the discriminator 204 compares an element having the largest size in the final search result vector $V_F$ with a threshold value ($\gamma_1$) in order to determine whether or not a signal search is performed (the same function as the discriminator of the exemplary case shown in FIG. 1). If a signal detection is recognized, as described above in FIG. 1, a signal detection test (or verification) process respective to the detected Doppler frequency and code phase is repeated several times. Conversely, if a signal detection is not recognized, the search result $R_{3,F}[m,n]$ is stored in the temporary memory 210, and, then, the SDFS 202 performs another signal search on the next sparse Doppler Frequency hypothesis (wherein $f_c$ is incremented by one (1): $f_c \to f_c+1$). If signal detection fails to be recognized in the result of the SDFS 202 with respect to all $5M_f+1$ sparse Doppler frequencies, the process step moves to block 203 in order to perform search on more subdivided Doppler frequencies (Doppler frequencies being searched at intervals that are smaller than the interval $f_m/T$ [Hz] of the sparse Doppler frequencies). At this point, search results $R_{3,F}[m,n]$ for all sparse Doppler frequencies, which are gained (or searched) by the SDFS 202 for each sparse Doppler frequency hypothesis, are stored in the temporary memory 210 and then delivered to a Doppler frequency tester (hereinafter referred to as 'SDFT') 203.

The SDFT technology corresponds to a method of acquiring a signal search result respective to another Doppler frequency, which is located between two Doppler frequencies, by using a simple signal processing method without performing the FFT method, from a hypothesis search result pair ($R_{3,F}[m,n]$ and $R_{3,F+2^W}[m,n]$) respective to two neighboring Doppler frequencies (indexes F and $F+2^W$, wherein W is a positive integer) being spaced apart from one another at an interval of $f_m/T$ [Hz] or less, wherein the signal search is performed by the SDFS 202. (A detailed description of the same will be provided later on with reference FIG. 4.)

First of all, the SDFT 203 simply sums the signal search result pair ($R_{3,F}[m,n]$ and $R_{3,F+2^W}[m,n]$) respective to two neighboring sparse Doppler frequencies (e.g., assuming that each Doppler frequency index corresponds to F and $F+2^W$), which are acquired from the SDFS 202. Then, by performing a simple real number multiplication process, which is referred to as "RESCALING", the SDFT 203 acquires a signal search result respective to a Doppler frequency having an index of $F+2^{W-1}$ and determines whether or not signal detection is declared through the discriminator 205.

If the signal detection is not declared, the process returns back to the SDFT 203, and, after acquiring a signal search result respective to two new intermediate frequencies (e.g., indexes $F+2^{W-2}$ and $F+2^{W-1}+2^{W-2}$), which are located between three Doppler frequencies (indexes F, $F+2^{W-1}$, and $F+2^W$), the discriminator 205 determines the signal search result. By using the above-described method, the SDFT 203 may be capable of easily acquiring a signal search result respective to the plurality of synthesized Doppler frequencies, which are located between two sparse Doppler frequencies, and, therefore, by carrying out a signal search process respective to the plurality of Doppler frequencies, wherein the number of Doppler frequencies increases when T is given a significantly large value, by performing simple summation and real number multiplication processes, the overall computational load required for acquiring a GNSS signal may be largely reduced, thereby enabling quick signal acquisition to be realized.

Figure 3:
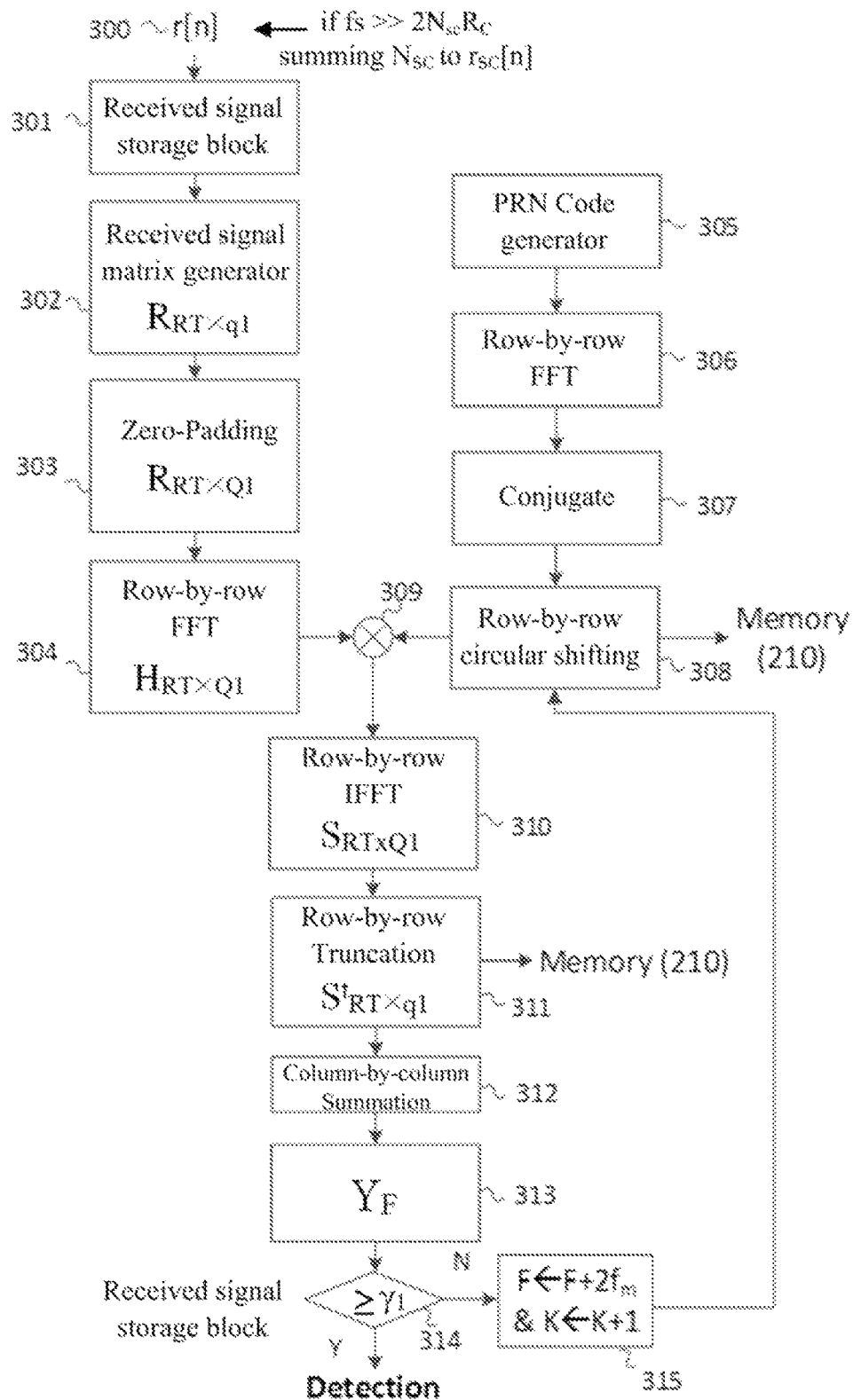
FIG. 3 is a block diagram illustrating an example of a process flow of a detailed signal processing function of a signal searcher of a GNSS receiver realizing the SDFS technology.

FIG. 3 is a block diagram illustrating an example of a process flow of a detailed signal processing function of a signal searcher of a GNSS receiver realizing the SDFS technology. FIG. 3 illustrates a structural view of a detailed signal processing block respective to an SDFS.

First of all, as described above with reference to FIG. 1, a signal r[n] 300, which is acquired by sampling a signal r(t) that is frequency down-converted to the intermediate frequency ($f_I$) by using a sampling frequency fs is inputted to a received signal storage block 301 and then inputted to a received signal matrix generator 302, so as to be converted to a signal matrix $R_{RT \times q1}$ having a size of $[R_T \times q_1]$. Herein, $q_1$ represents a number of samples of signals being inputted during a time period of $T_1$ seconds (=1 ms) ($q_1=fsT_1$). Herein, if fs is exceedingly greater than 2Rc (e.g., when fs=12Rc, r[n] is given 12 samples per chip), the respective size may be reduced by creating a sample processed with time-based compression by calculating an average (or summed) value of some of the r[n] samples in order to reduce the number of signal samples being inputted. More specifically, when fs=12Rc, by summing $N_{sc}$ consecutive r[n] sample values (e.g., wherein $N_{sc}=3$) to one value, so as to generated an $r_{sc}[n]$, if the number of r[n] samples during a time period of $T_1$ seconds was initially equal to $fsT_1$, since the number of $r_{sc}[n]$ samples during the time period of $T_1$ seconds is reduced to $fsT_1/N_{sc}$, and since $r_{sc}[n]$ has a small number of samples, which corresponds to $q_c(=4=12/N_{sc})$ per chip, and which is equal to or greater than 1, a significant distortion is also not generated with respect to the inputted signal during such time-based compression process. In other words, when $fs>>2N_{sc}Rc$, the inputted signal r[n] is converted to a compressed signal $r_{sc}[n]$, which is configured of a sum of $N_{sc}$ consecutive samples, and the samples of the inputted signals $r_{sc}[n]$ being inputted during each time period of $T_1$ seconds (i.e., a total of $q_1$ samples) are serially filled into each row starting from Row 1 to Row $R_T$ of the signal matrix $R_{RT \times q1}$ and then outputted to a zero-padding block 303.

The zero-padding block 303 inserts a number of zeros (0's), so that the row length of the signal matrix $R_{RT \times q1}$ can be equal to a smallest value $Q_1$ among integer powers of 2, which are greater than $2q_1$ (i.e., a smallest $Q_1$, when $Q_1>2q_1$, and when $\log_2 Q_1$ is a natural number (or integer)). For example, when $q_1=2046$, among integers that are greater than $2q_1=4092$, $Q_1=4096$ becomes the smallest power of 2 (as a result, $Q_1$ becomes slightly greater than the number of signal sampled being inputted during a time period of $2T_1$ seconds). Each row of the new matrix $R_{RT \times Q1}$ having zeros (0's) inserted therein by the zero-padding block 303 is converted to a frequency domain value by the FFT block 304 via FFT and then outputted as $H_{RT \times Q1}$ (i.e., each row of $H_{RT \times Q1}$ corresponds to the FFT output of each row of $R_{RT \times Q1}$). Meanwhile, a PRN code generator 305, a row-by-row (or row-direction) FFT block 306, and a conjugate block 307 respectively perform the same functions of block 106, block 107, and block 108, which are shown and described in FIG. 1 (and since the functions are identical, detailed description of the same will be omitted for simplicity), and a row-by-row circular shift block 308 performs the same function (circular shifting) as block 105 of FIG. 1.

However, the PRN code generator 305 samples a PRN code signal, which is generated as a chip rate of Rc, to $q_c$ number of signals per chip, thereby outputting a total of $Q_1$ number of samples (Accordingly, signal samples each corresponding to a time length slightly longer than the time period of $2T_1$ are generated). The row-by-row FFT block 306 performs $Q_1$-point FFT, and the conjugate block 307 performs conjugate conversion on the input (i.e., the conjugate block 307 performs +/− sign conversion of imaginary numbers). The output ($Q_1$ length) of the conjugate block 307 being processed with circular shifting by the row-by-row circular shift block 308 and each row ($Q_1$ length) of the row-by-row FFT block 304 are processed with element-by-element multiplication by a multiplier 309, and, then, the multiplied result is inputted to a row-by-row IFFT block 310. The row-by-row IFFT block 310 performs a $Q_1$-point Inverse FFT process on each of the $Q_1$ number of result being outputted from the multiplier 309 in each row, and, by performing this process on a total of $R_T$ number of rows, a correlation result matrix $S_{RTxQ1}$ is obtained, which is then outputted to a row-by-row truncation block 311. The row-by-row truncation block 311 may acquire a new correlation result matrix $S^t_{RT \times q1}$ (herein, $S^t_{RT \times q1}$ corresponds to a matrix having a similar significance as $R_{3,F}[m,n]$, which is described and used in FIG. 2), by using only a first column to a $q_1^{th}$ column of the correlation result matrix $S_{RTxQ1}$. And, by adding (or summing) each column along the column direction, a column-by-column (or column-direction) summation block 312 may acquire a final output $Y_F$ 313 respective to a Doppler frequency index F having the size of $[1 \times q_1]$.

The SDFS discriminator 314 compares a maximum value of $|Y_F|$(=absolute values of $Y_F$ elements) with a threshold value ($\gamma_1$), so as to determine whether or not signal search is performed. Similarly, when signal detection is declared (i.e., when an element of $Y_F$ greater than or equal to $\gamma_1$ exists), a final signal detection is decided by repeatedly performing re-testing (or re-verification) processes on a code phase of a detected signal, which corresponds to a sample index indicated by a maximum value of $|Y_F|$, and a currently detected sparse Doppler frequency (index F). If signal detection is not declared by the SDFS discriminator 314, after incrementing the sparse Doppler frequency index $f_c$ by one (1) and incrementing K by one (1), row-by-row circular shift is performed by block 308 in accordance with a K value that is incremented by one (1), which corresponds to a newly incremented sparse Doppler frequency (index $F=2f_m(f_c+1)$). At this point, since the procedure performed by block 305 to block 308 corresponds to the procedure identically repeating the process prior to incrementing the value K by one (1), of the previous result of block 308 is stored in the temporary memory 210, instead of repeatedly performing the procedure performed by the PRN code generator 305 up to the row-by-row circular shift block 308, the data stored in the memory may be opened, so as to increment K by one (1), i.e., to perform circular shift on the element by one. Then, the corresponding result may be used (315).

Figure 4:
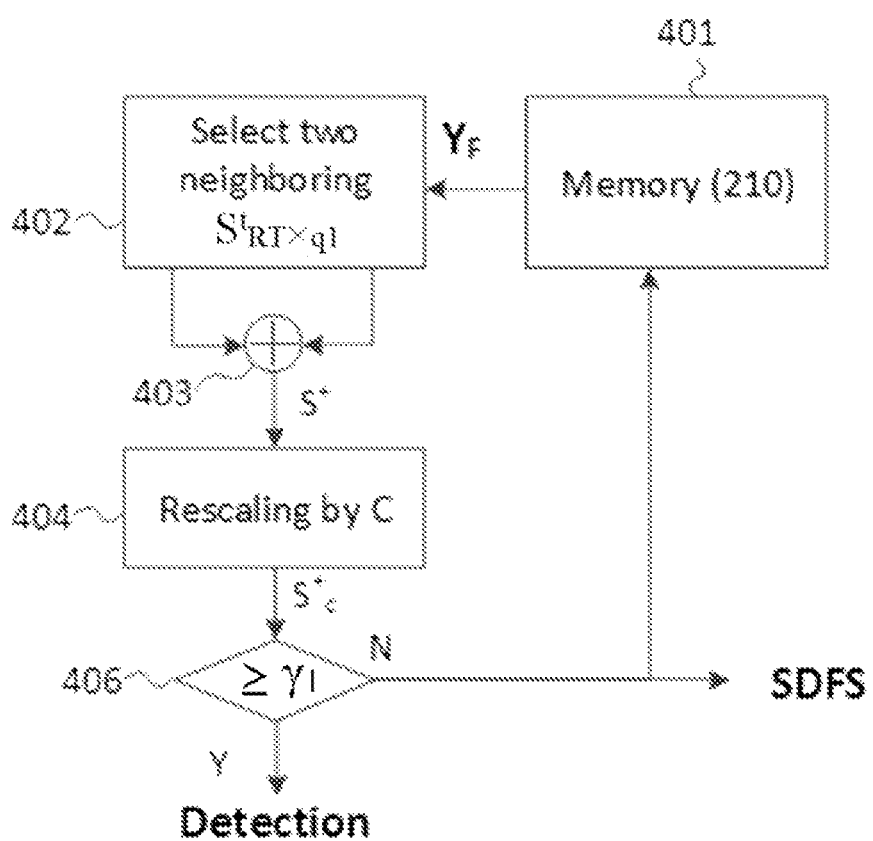
FIG. 4 is a block diagram illustrating another example of a process flow of a detailed signal processing function of a signal searcher of a GNSS receiver realizing the SDFT technology.

FIG. 4 is a block diagram illustrating another example of a process flow of a detailed signal processing function of a signal searcher of a GNSS receiver realizing the SDFT technology.

In the following description, among the $N_{DF}$ number of signal matrices $S^t_{RT \times q1}$, which are acquired with respect to each of the $S^t_{RT \times q1}$ number of sparse Doppler frequencies created in the SDFS, it will be assumed that two arbitrary neighboring sparse Doppler frequency indexes respectively correspond to $F1=2f_m f_c$ and $F2=2f_m(f_c+1)$. Additionally, all Doppler frequencies existing between two arbitrary neighboring sparse Doppler frequencies (e.g., F1 and F2) will be defined as synthesized Doppler frequencies. Therefore, a selection block 402 receives two signal matrices corresponding to F1 and F2 from a temporary memory 401 (i.e., 210 of FIG. 2), wherein the output of the SDFS 202 is stored. A summer (or summing unit) 403 generates a new signal matrix $S^+$ by performing an element-by-element sum of the selected two signal matrices.

A rescaling block 404 easily compensates amplification distortion, which is caused by the summing of the signal matrix $S^+$ in block 403, by using a method of multiplying an $m^{th}$ row of the signal matrix $S^+$ by a specific real number C[m] (wherein m=0, 1, 2, . . . , $R_T$−1). A vector C(={c[m] |m=0, 1, 2, . . . , $R_T$−1}), which is configured of real number values being multiplied in each row, may be deduced by using an algorithm, which is already disclosed. (Refer to related theses for more detail.) Subsequently, after having its amplification distortion compensated, a new signal matrix $S^+_c$ is summed along the column-by-column (or column-direction), as in the column-by-column summing block 312 of FIG. 3, thereby creating a vector $Y_S$ having the size of $[1 \times q_1]$. Thereafter, an SDFT discriminator 406 compares the largest element value of the absolute value vector $|Y_S|$ with the threshold value ($\gamma_1$), so as to determine whether or not signal search is performed. Herein, $S^+_c$ corresponds to a synthesized Doppler frequency located between sparse Doppler frequencies F1 and F2 and has an index of $F'=2f_m(f_c+0.5)$.

And, at this point, since this index indicates a signal search result ($S^t_{RT \times q1}$) respective to the corresponding synthesized Doppler frequency, $S^+_c$ is stored in the temporary memory 401 in order to be used for the search of a next synthesized Doppler frequency (e.g., a synthesized Doppler frequency located between F1 and F' or a synthesized Doppler frequency located between F2 and F'). Similarly, when signal detection is declared, a final signal detection is decided by repeatedly performing re-testing (or re-verification) processes on a code phase (corresponding to a sample index indicated by a maximum value of $|Y_S|$) of a detected signal and a currently detected Doppler frequency (index $F=2f_m(f_c+0.5)$).

If the SDFT discriminator 406 does not declare signal detection, the process may be carried out in three different methods, which will be described as follows. A first method corresponds to a method of attempting to perform signal detection respective to a new Doppler frequency corresponding to $F3=2f_m(f_c+2)$ after returning to the SDFS (in case the SDFS has not completed the search on all sparse Doppler frequencies and has searched the sparse Doppler frequencies up to only F2).

A second method corresponds to a method of performing synthesized Doppler frequency search, wherein the synthesized Doppler frequency is located between F2 and F3, by acquiring a signal search result ($S^t_{RT \times q1}$) of $F3=2f_m(f_c+2)$ and F2, after returning to the selection block 402, when the SDFS has already completed the search on all Doppler frequencies. And, a third method corresponds to a method of performing signal search for respective a synthesized Doppler frequency located between F1 and F' or a synthesized Doppler frequency located between F2 and F'.

The above-described flow chart of the SDFT signal processing procedure of FIG. 4 may be repeated as many times until the search on all synthesized Doppler frequencies is completed at intervals equal to or less than the Doppler frequency search interval (1/(2T)), which is decided by the overall signal correlation length T.

Figure 5:
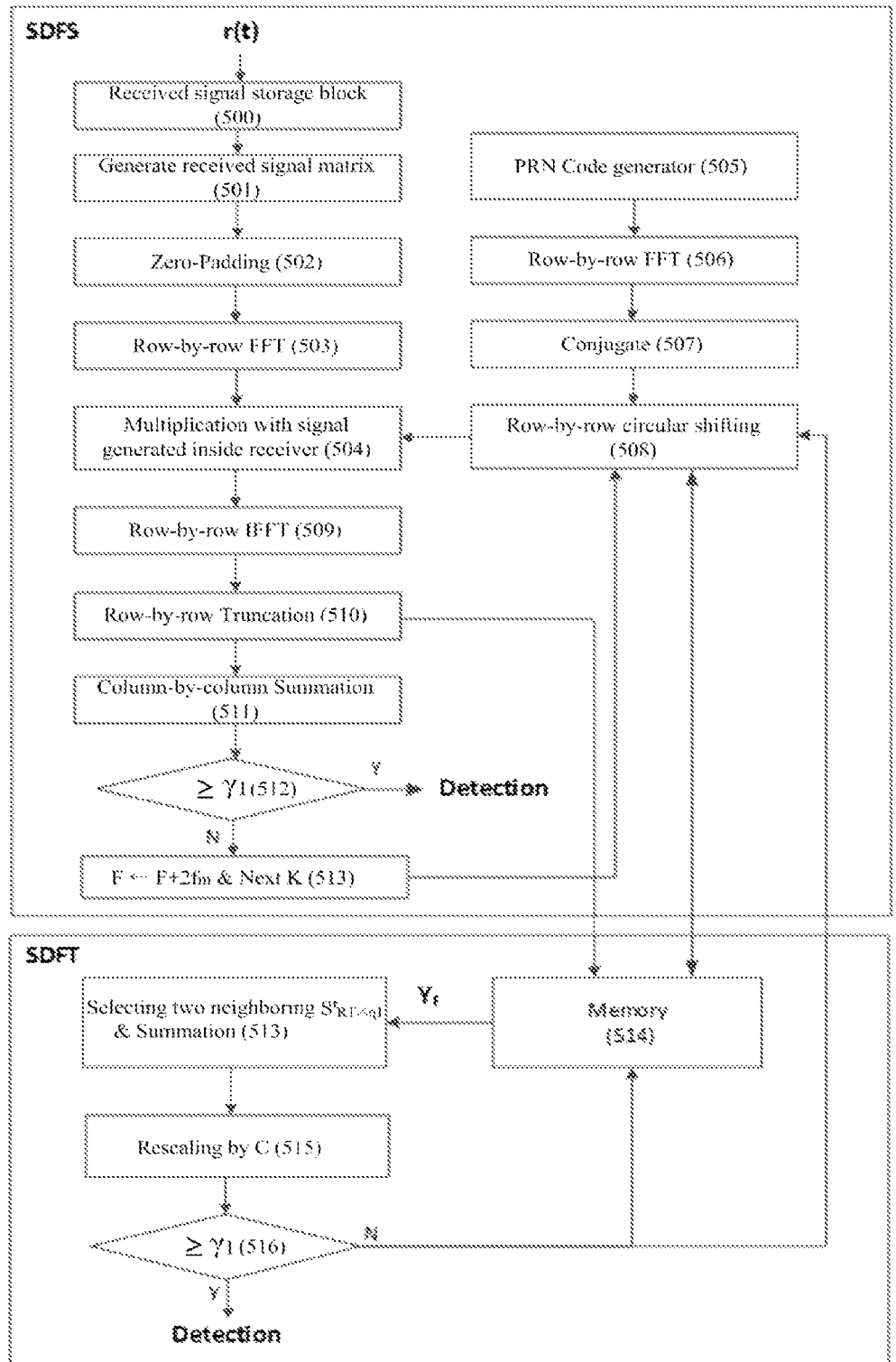
FIG. 5 is a block diagram illustrating an example of a process flow of a detailed signal processing function of a signal searcher of a GNSS receiver based upon the SDFS and SDFT technologies.

FIG. 5 is a block diagram illustrating an example of a process flow of a detailed signal processing function of a signal searcher of a GNSS receiver based upon the SDFS and SDFT technologies. FIG. 5 illustrates a detailed flow chart of an overall signal processing procedure, wherein all methods shown in FIG. 2, FIG. 3, and FIG. 4 are combined. Therefore, detailed description of the same will be omitted for simplicity.

A part that will be additionally described in FIG. 5 corresponds to an interworking unit between the SDFS and the SDFT. Herein, when a signal respective to a sparse Doppler frequency hypothesis (index F), which is verified (or tested) by an SDFT discriminator 512, is not searched, block 513 increments the F value as much as a sparse Doppler frequency search interval and also increments the K value by one (1), so that the SDFS can perform search on the next sparse Doppler frequency, and, then, block 513 delivers the control information to the row-by-row circular shift block 508.

At this point, since the control information that is being delivered indicates the K value of the conventional circular shift function to be incremented by one (1), the circular shift function may store its previous circularly shifted vector in a temporary memory 514 (i.e., 210 of FIG. 2) and may, then, open the temporarily stored vector, so as to perform a process of circularly shifting all elements by only one element position.

By using the above-described method, the procedure corresponding to block 505 to block 507 may be omitted. Additionally, the row-by-row truncation block 510 may store a new correlation result matrix $S^t_{RT \times q1}$, which is configured of a sparse Doppler frequency hypothesis being generated by index F or by circular shift value K, in the temporary memory 514 (i.e., 210 of FIG. 2), so that the stored correlation result matrix can be used by the SDFT in a later process.

The interworking between the SDFS and the SDFT may be carried out by using two different methods. A first method corresponds to completing the search of all sparse Doppler frequency hypotheses firsthand by using the SDFS. While performing SDFS, the correlation result matrix $S^t_{RT \times q1}$, which is acquired from all sparse Doppler frequencies stored in the temporary memory 514, may be received from block 513 of the SDFT, so that the SDFT can perform synthesized Doppler frequency search on synthesized Doppler frequencies located between sparse Doppler frequencies.

A second method corresponds to a method of searching for all Doppler frequencies by alternately performing SDFS and SDFT, by having the SDFS complete signal search for respective two sparse Doppler frequencies firsthand, by having the SDFS search for a next sparse Doppler frequency and, then, by having the SDFT carry out a search process of a synthesized Doppler frequency located between an already existing sparse Doppler frequency and a newly searched sparse Doppler frequency. In case of the second method, as shown in the drawing, the SDFT discriminator 516 is required to send out a control command indicating a circular shift, which corresponds to incrementing K by one (1), to the row-by-row circular shift block 508.

In short, by using the SDFS technology a search for sparse Doppler frequencies, which are sparsely spaced apart from one another at relatively large intervals ($f_m/T$ [Hz]) within a frequency axis, is performed, and the SDFT may use the result of the SDFS in order to perform a more detailed signal search on synthesized Doppler frequencies within the intervals, which are sparsely spaced apart from one another, by performing simple addition and real number multiplication processes. Since this technology has a very low tracking signal intensity, this technology may be directly used without any modification even in a frequency tracking device of a GNSS receiver, wherein T is required to set up to be much more greater than 1 ms.

For example, when it is given that the Doppler frequency of a currently detected GNSS satellite corresponds to Fc[Hz], by performing the signal detection of the GNSS satellite by assuming Doppler frequencies respective to Fc−δ and Fc+δ (wherein δ corresponds to an extremely low value), and by performing signal search for respective another synthesized Doppler frequency existing within a section between [Fc−δ, Fc+δ], a more accurate Doppler frequency detection and tracking may be performed. The basic realization of such frequency tracking device is realized to have a structure similar to those of FIG. 2, FIG. 3, FIG. 4, and FIG. 5.

As described above a GNSS receiver (or GPS receiver or spread spectrum mobile communication and satellite communication receiver) does not perform signal search for respective Doppler frequencies of all cases. Instead, the GNSS receiver uses the SDFS technology to perform signal search only respective to sparse Doppler frequencies that are sufficiently spaced apart from one another, and the GNSS receiver uses the SDFT technology to perform signal search for respective synthesized Doppler frequencies located between the sparse Doppler frequencies. And, since the synthesized Doppler frequency signals search performed by using the SDFT may be performed by carrying out simple addition and multiplication processes without having to perform actual correlation, the computational load may be largely reduced and a high-speed signal search process may be performed at the same time. In an actual indoor environment, a GPS receiver is incapable of detecting any GPS satellite signals and measuring the respective positions because a correlation length T for detecting severely attenuated signals is very long (i.e., increased to 100 times or more than the outside environment) and also because the respective computational load also increases significantly. The signal processing method and the device outstandingly reduces (to approximately 50 to 100 times) signal search time and computational load of the conventional GNSS receiver (GPS receiver), while enabling the GPS receiver to quickly detect and easily track severely attenuated signals in an indoor environment at the same time.

As described above, the signal processing method for ultra-fast acquisition and tracking of severely attenuated spread spectrum signals with Doppler frequency and apparatus thereof have the following advantages.

The SDFS and SDFT technologies may be applied to frequency trackers, code phase trackers, phase trackers, and so on, which can track attenuated signals by using a fast and small computational load.

The above-described device may be realized in the form of a hardware component, a software component, and/or a combination of a hardware component and a software component. For example, the device and corresponding components according to the above-described may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. The signal processing method and device may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the signal processing method, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the signal processing method, and vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A signal processing method, implemented via a receiver apparatus, the method comprising:
   receiving, at a processor in the receiver apparatus, a spread spectrum signal from a Global Navigation Satellite System (GNSS);
   generating, by using the processor, a first matrix for a first Doppler frequency hypothesis and a second matrix for a second Doppler frequency hypothesis, wherein the first Doppler frequency hypothesis and the second Doppler frequency hypothesis are separated by a predetermined frequency interval, and wherein each of the first matrix and the second matrix consists of consecutive sets of correlation results for all code phase hypotheses for a given Doppler frequency;
   identifying, by using the processor, within each of the first matrix and the second matrix, a code phase hypothesis that produces a correlation result that is larger than a detection threshold;
   generating, by using the processor, in a case where no correlation result is found in the first matrix and the second matrix that is larger than the detection threshold, a third matrix for an intermediate Doppler frequency hypothesis in the middle of the first Doppler frequency hypothesis and the second Doppler frequency hypothesis by applying an algebraic operation with the first matrix and the second matrix;
   identifying, by using the processor, a code phase hypothesis that produces a correlation result in the third matrix that is larger than the detection threshold; and
   synchronizing, by the receiver apparatus, the spread spectrum signal using the code phase hypothesis that produces a correlation result that is larger than the detection threshold,
   wherein identifying the code phase hypothesis within each of the first matrix and the second matrix comprises:
   summing the consecutive sets of correlation results in the first matrix and the second matrix to build a single combined set of correlation results for all code phases hypotheses; and
   identifying a correlation result of a code phase hypothesis in the single combined set of correlation results that is larger than the detection threshold.

2. The method of claim 1,
   wherein generating the third matrix comprises:
   summing two consecutive sets of correlation results in the first matrix and the second matrix which are stored in a memory to generate a sum of the correlation results; and
   rescaling the correlation results in the summed correlation results.

3. The method of claim 1,
wherein in a case where no correlation result is found in the third matrix that is larger than the detection threshold, the method further comprises:
generating a fourth matrix for a Doppler frequency hypothesis in the middle of the first Doppler frequency hypothesis and the intermediate Doppler frequency hypothesis;
summing the consecutive sets of correlation results, in the fourth matrix, to build a single combined set of correlation results for all code phase hypotheses; and
identifying a correlation result of a code phase hypothesis in the single combined set of correlation results larger than the detection threshold,
wherein the generating the fourth matrix comprises summing the first matrix for the first Doppler frequency hypothesis and the second matrix for the second Doppler frequency hypothesis, and rescaling each set of correlation results in the summed matrix.

4. The method of claim 3, wherein in a case where no correlation result is found in the third matrix that is larger than the detection threshold, the method further comprises:
generating a fifth matrix for a Doppler frequency hypothesis in the middle of the intermediate Doppler frequency hypothesis and the second Doppler frequency hypothesis;
summing the consecutive sets of correlation results, in the fifth matrix, to build a second single combined set of correlation results for all code phase hypotheses; and
identifying a correlation result of a code phase hypothesis in the second single combined set of correlation results in the fifth matrix larger than the detection threshold.

5. The method of claim 1, in a case where no correlation output is found in the third matrix that is larger than the detection threshold, the method further comprises:
generating a new matrix for the Doppler frequency hypothesis between any two Doppler frequency hypotheses searched previously by summing the matrices, each of which consists of consecutive sets of correlation results, corresponding to the two Doppler frequency hypotheses, and rescaling each set of correlation results in the summed matrix,
summing the consecutive sets of correlation results, in the new matrix, to build a single combined set of correlation results for all code phase hypotheses, and
identifying a correlation result in the single combined set of correlation results larger than the detection threshold,
wherein the generating the new signal matrix is repeated for all Doppler frequency hypotheses between any two Doppler frequency hypotheses searched previously until a correlation result in the single combined set of correlation results of the new signal matrix is found larger than the detection threshold.

6. The method of claim 1, wherein generating the first matrix and the second matrix comprises:
building each set of correlation results by frequency domain multiplication of the received spread spectrum signal and a spreading code, wherein both the received spread spectrum signal and the spreading code are collected for a time interval in an integer multiple of a code period; and
converting the multiplied frequency domain signal to the time domain.

* * * * *